UNITED STATES PATENT OFFICE 2,472,629

METHOD OF PREPARATION OF DIMETHYL SILICONE GUMS

Murray M. Sprung, Scotia, N. Y., assignor to General Electric Company, a corporation of New York No Drawing. Application June 11, 1946, Serial No. 676,091

9 Claims. (Cl. 260—46.5)

This invention is concerned with the preparation of synthetic elastic compositions comprising dimethyl silicone gums. More particularly, the invention is concerned with a method of making an elastic gum which comprises contacting a dimethyl silicone (dimethyl polysiloxane), preferably a liquid dimethyl silicone, with a compound selected from the class of compounds represented by the general formulas:

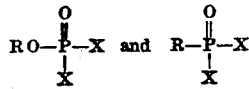

where R is a hydrocarbon radical selected from the class consisting of alkyl, aryl, aralkyl and alkaryl radicals, and X is a halogen, e. g., chlorine, bromine, fluorine, etc. For brevity, compounds embraced by the above formulas will hereinafter be designated generically as "organophosphorus halides."

Two of the more specific embodiments of my invention comprise treating a dimethyl silicone with phenoxy phosphoryl dichloride (phenoxy phosphorus oxydichloride) having the formula

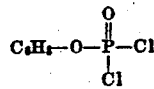

or with phenyl phosphonyl dichloride (phenyl phosphorus oxydichloride) having the formula

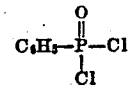

for a length of time and at a temperature sufficient to convert the said dimethyl silicone to a product having elastic properties, compounding the said product with a filler and a curing or vulcanizing agent, and thereafter advancing the cure of the filled material under the influence of heat.

Since the organophosphorus halide compounds used in practicing my invention are soluble in the dimethyl silicone, effective concentrations are more easily controlled, and more reproducible results are obtained. Furthermore, these compounds cause the desired elastic gums to form at or near room temperatures, and result in more soluble (e. g., in toluene) products than are obtained with catalysts which must be used at elevated temperatures.

The invention is based on my discovery that elastic gums may be prepared by suitable treatment of dimethyl silicones; also, that such elastic gums may be compounded with fillers, cure accelerators, etc., and molded or extruded to form products exhibiting many of the physical characteristics, such as elasticity, compressibility, etc., of known natural rubber and other synthetic elastomers. The products are characterized by their flexibility at low temperatures and particularly by their heat resistance. The synthetic dimethyl silicone elastomers made from these elastic gums retain their tensile strengths, elongation or stretch, flexibility, etc., even when heated for long periods of time at elevated temperatures of, e. g., from 150° to 200° C., without deterioration.

The dimethyl silicones found suitable for the preparation of the elastic gums as well as the synthetic elastomers possessing the above-mentioned properties are those obtained, e. g., by the hydrolysis of a pure or substantially pure dimethyl dihalogenosilane, e. g., dimethyl-dichlorosilane, or a dimethyl-substituted silane (the methyl groups being joined to the silicon atom through carbon atoms), whose other two valences are satisfied by radicals which themselves are readily hydrolyzable, for instance hydrogen, amino, alkoxy, aroxy, acyloxy, etc., radicals. While the term "dimethyl silicone" has been broadly used to designate complex condensation products containing an average of two methyl groups per silicon atom, it is used herein and in the appended claims to mean a silicone (polysiloxane) in which all or substantially all of the silicon atoms are each connected to two methyl groups.

Various methods may be employed to prepare the dimethyl silicones used in the practice of this invention. For example, substantially pure dimethyl dichlorosilane or dimethyl dichlorosilane containing up to about 2 mol per cent methyl trihalogenosilane, more specifically methyl trichlorosilane, is hydrolyzed in manners now well known in the art. The oily hydrolysis product may then be fractionally distilled to remove the low-boiling materials (trimers, tetramers, etc.) thereby obtaining the higher molecular weight liquid dimethyl silicones, which may then be contacted with the desired organophosphorus halide to convert it to a dimethyl silicone gum. Optimum properties of the dimethyl silicone gum, as well as of the dimethyl silicone elastomer, are obtained from hydrolysis products of a mixture comprising substantially dimethyl dichlorosilane and not more than 0.5 mol per cent methyl trichlorosilane. Stated alternatively, hydrolysis products found useful in the practice of my invention, which hydrolysis products hereinafter are generically referred to as "dimethyl silicones," are those having a methyl-to-silicon ratio of from 1.98, preferably 1.995, to 2 methyl groups per silicon atom.

More specific directions for the preparation of the dimethyl silicones may be found, e. g., in the copending Patnode applications Serial Nos. 463,-813 and 463,815, filed October 29, 1942, each now abandoned; and in Agens application Serial No. 526,473 (now U. S. Patent 2,448,756, issued September 7, 1948). filed March 14, 1944. All the foregoing applications have been assigned to the same assignee as the present invention.

The transformation of the liquid, oily or crystalline dimethyl silicones to the elastic gum stage in accordance with my invention is not exactly understood, but it is believed to be due to a rearrangement of the repetitive units

of the dimethyl silicone into polymers of extremely high molecular weight which may be best described as elastic gums or, more specifically, dimethyl silicone gums. The properties of these gums may be defined as being elastic, that is, compressible but capable of returning substantially to their original shape when the pressure is removed. Therefore, by my description of the elastic gums (including elastoplastic gums), I intend to exclude from the definition of "dimethyl silicone gums" or "elastic gums" all materials which are hard and brittle as such. However, it will be apparent to those skilled in the art that the formed elastic gums will include lower as well as higher molecular weight polymers which, if separated into their components, might yield materials varying in properties from thick, sticky masses to very firm, slightly compressible, though still elastic, fractions.

The transformation of the dimethyl silicone to an elastic gum may be accomplished in a number of ways. One method comprises dissolving the organophosphorus halide in the dimethyl silicone and allowing the mixture to stand with or without agitation at normal temperatures for extended periods of time. To hasten the conversion of the dimethyl silicone, the mixture of the dimethyl silicone and the organophosphorus halide may be heated at elevated temperatures ranging from substantially above room temperature up to about 150° C. The time required to convert the dimethyl silicone to the elastic stage will differ depending, for example, upon the concentration of the organophosphorus halide, the type of dimethyl silicone employed, the temperature at which the conversion is being effected, etc. For example, at room temperatures, from about 2 to 10 or 20 days may be required to convert the dimethyl silicone to an elastic gum having suitable properties. At temperatures of the order of from about 50° to 150° C., the conversion may be effected in from about 5 to 24 hours.

The amount of the organophosphorus halide employed may also be varied over wide limits depending, for instance, upon the reaction conditions and the type of dimethyl silicone employed. Thus, by weight, I may use from 0.1 to as high as 5 or 10 per cent of the organophosphorus halide based on the weight of the dimethyl silicone. Preferably, the amount of the organophosphorus halide is from about 0.5 to 3 per cent of the weight of the dimethyl silicone.

To prepare the synthetic elastomers (synthetic dimethyl silicone elastomers or silicone rubbers), the elastic gum is worked on ordinary mixing (differential) rolls used in milling rubber until it attains the desired consistency for molding or extruding. Various fillers, for example, titanium dioxide, and cure accelerators, for example, benzoyl peroxide, in an amount equal to from about 0.5 to 5 or 6 per cent by weight of the dimethyl silicone gum, may be incorporated during this operation. After being formed into the desired shape, for example, under heat and pressure, the cured synthetic dimethyl silicone elastomers may be further cured or vulcanized by heating in an oven until the desired degree of cure is obtained. The latter heat treatment in many cases increases the strength properties of the synthetic elastomer.

The liquid dimethyl silicone which I may use as a starting material may be obtained by several methods. For example, pure or substantially pure dimethyl dichlorosilane may be hydrolyzed in water, aqueous hydrochloric acid or in an aqueous solution of sodium hydroxide, etc. Although the method of hydrolysis is not critical, I prefer to use a procedure which yields a liquid product containing a minimum of low-boiling polymers. Such products are obtained, for example, when the hydrolysis is carried out in, for instance, an aqueous solution of certain metal halides, e. g., ferric chloride or alkali-metal hydroxides, e. g., sodium hydroxide.

In order that those skilled in the art may better understand how the present invention may be practiced, the following examples thereof are given by way of illustration and not by way of limitation. All parts are by weight.

EXAMPLE 1

A dimethyl silicone oil was prepared by slowly adding about 258 parts of a methylchlorosilane comprising substantially pure dimethyldichlorosilane to an amount of water (about 950 parts) sufficient to more than hydrolyze the aforementioned methylchlorosilane. The oily layer which formed was separated, washed with water and sodium carbonate solution, and centrifuged to remove small amounts of solid material and traces of suspended water. Phenoxy phosphoryl dichloride was added in varying amounts to about 100 parts of this dimethyl silicone, and the mixtures were allowed to stand at temperatures ranging from normal to about 100° C. for varying lengths of time. The following table shows the results obtained by contacting the dimethyl silicone with phenoxy phosphoryl dichloride.

Table I

| Sample No. | Parts Phenoxy Phosphoryl Dichloride | Length of Time | Temperature °C. | Character of Products |
|---|---|---|---|---|
| A | 0.5 | 13 days | 25 | Soft, rubbery solid. |
| B | 1.0 | 7 days | 25 | Do. |
| C | 1.5 | do | 25 | Do. |
| D | 1.0 | 10 hours | 100 | Soft, elastic gum. |
| E | 1.0 | 14 days | 25 | Soft, stretchy gum. |
| F | 1.0 | 5 days | 25 | Soft, elastic gum. |

EXAMPLE 2

The elastic products obtained in sample Nos. B, D, E and F (see Example 1) were milled on differential rubber rolls for about 15 minutes with titanium dioxide, lead oxide (to neutralize residual acidity) and benzoyl peroxide dissolved in a small amount of toluene to yield a smooth, homogeneous sheet. The formulation in each case was as follows:

| Ingredients: | Parts |
|---|---|
| Elastic gum | 94.0 |
| Titanium dioxide | 188.0 |
| Lead oxide (PbO) | 9.4 |
| Benzoyl peroxide (in about 10 parts toluene) | 2.35 |

After the milling operation, the mass, in each case, was removed from the rolls and pressed into the form of a sheet at about 150° C. for 10 minutes under a pressure of approximately 500 lbs. per sq. in. The formed sheets were then cured further by heating them at 150° C. for about 18 hours. The table below shows the tensile strength and elongation at break of these various samples.

*Table II*

| Sample No. | Tensile Strength, Lbs./sq. in. | Per Cent Elongation at Break |
|---|---|---|
| B | 500 | 100 |
| D | 440 | 100 |
| E | 730 | 100 |
| F | 700 | 100 |

EXAMPLE 3

100 parts of a liquid dimethyl silicone similar to that used in Example 1 was thoroughly mixed with one part phenyl phosphonyl dichloride, and the mixture was allowed to stand for 49 days at room temperature. At the end of this time a soft, elastic, stretchy gum was obtained. To 100 parts of the elastic gum was added 200 parts titanium dioxide, 10 parts lead oxide (PbO) and 2.5 parts benzoyl peroxide. This mixture was milled for 20 minutes on cold differential rubber rolls to yield a smooth, homogeneous sheet. The milled compound was removed from the rolls and pressed into the form of a sheet using the same curing cycle as was employed in Example 2. Samples of this sheet were heated for varying lengths of time at different temperatures to determine the effect of the after-bake on the properties of the material. Table III shows the results of these treatments.

*Table III*

| Hours | Temperature, °C. | Tensile Strength, Lbs./sq. in. | Per Cent Elongation at Break | Shore Hardness |
|---|---|---|---|---|
| | No cure | 165 | 375 | 24 |
| 2 | 150 | 450 | 200 | 50 |
| 6 | 150 | 505 | 200 | 55 |
| 18 | 150 | 475 | 150 | 57 |
| 6 | 200 | 380 | 150 | 54 |
| 12 | 200 | 430 | 200 | 53 |
| 18 | 200 | 495 | 175 | 58 |

In place of the phenoxy phosphoryl dichloride used in Example 1, or the phenyl phosphonyl dichloride used in Example 2, other organophosphorus halides may be employed. These include the alkoxy phosphoryl dihalides, e. g., methoxy phosphoryl dichloride, propoxy phosphoryl dichloride, ethoxy phosphoryl dibromide, amyloxy phosphoryl dichloride, etc.; other aryloxy phosphoryl dihalides, e. g., phenoxy phosphoryl dibromide, phenoxy phosphoryl difluoride, naphthoxy phosphoryl dichloride, etc.; alkaryloxy phosphoryl dihalides, eg., tolyloxy phosphoryl dichloride, ethylphenoxy phosphoryl dibromide, etc.; aralkoxy phosphoryl dihalides, e. g., benzyloxy phosphoryl dichloride, phenylethoxy phosphoryl dibromide, etc.; alkyl phosphonyl dihalides, e. g., methyl phosphonyl dichloride, propyl phosphonyl dichloride, ethyl phosphonyl dibromide, amyl phosphonyl dichloride, etc.; other aryl phosphonyl dihalides, e. g., phenyl phosphonyl dibromides, phenyl phosphonyl difluoride, naphthyl phosphonyl dichloride, etc.; alkaryl phosphonyl dihalides, e. g., tolyl phosphonyl dichloride, ethylphenyl phosphonyl dibromide, etc.; aralkyl phosphonyl dihalides, e. g., benzyl phosphonyl dichloride, phenylethyl phosphonyl dibromide, etc. Methods for preparing the compounds employed in the practice of this invention may be found in the various literature references available to those skilled in the chemical art, e. g., Beilstein's Handbuch der Organische Chemie (fourth edition).

It will be understood, of course, by those skilled in the art that fillers other than the titanium dioxide disclosed in the foregoing examples may also be used. These include lithopone, zinc oxide, talc, ferric oxide and other finely divided solid materials often employed as fillers for known natural and synthetic rubbers.

The dimethyl silicone gums and the synthetic dimethyl silicone elastomers prepared therefrom are useful in applications where materials having elastic-like (rubber-like) properties are required, for instance, for gaskets, electrical conductor insulation, shock absorbers, etc. Owing to their extraordinary resistance to deterioration at elevated temperatures, they are particularly useful in applications where natural rubber or other synthetic elastomers (rubbers) fail due to the deleterious effect of heat. The synthetic dimethyl silicone elastomers prepared from the dimethyl silicone gums made according to my invention are further endowed with the property of retaining their flexibility at low temperatures.

What I claim as new and desire to secure by Letters Patent of the United States is:

1. The method as in claim 4 wherein R is an alkyl radical.

2. The method as in claim 4 wherein R is an aryl radical.

3. The process as in claim 9 wherein the treating compound of the class of compounds represented by the general formulas set forth therein is phenoxy phosphoryl dichloride and the filler is titanium dioxide.

4. The method of preparing a solid, elastic, curable, polymerized, methyl-substituted polysiloxane containing an average of from 1.98 to 2.0 methyl groups per silicon atom, which method comprises contacting a liquid polymeric dimethylsiloxane containing an average of from 1.98 to 2.0 methyl groups per silicon atom and containing up to 2 mol per cent copolymerized monomethylsiloxane with from 0.1 to 10 per cent, by weight, of an organophosphorus compound represented by the general formula

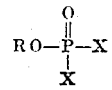

where R is a hydrocarbon radical selected from the class consisting of alkyl, aryl, alkaryl and aralkyl, and X is a halogen.

5. The method of producing a solid, elastic, curable, polymerized, methyl-substituted polysiloxane containing an average of from 1.98 to 2.0 methyl groups per silicon atom, which method comprises reacting a mixture comprising (1) a liquid polymeric dimethylsiloxane containing an average of from 1.98 to 2.0 methyl groups per silicon atom and containing up to 0.5 mol per cent copolymerized monomethylsiloxane and (2)

from 0.5 to 3 per cent, by weight, of a phenoxy phosphoryl dihalide until a solid elastic product is obtained.

6. The process of producing a solid, elastic, curable, polymerized, methyl-substituted polysiloxane containing an average from 1.98 to 2.0 methyl groups per silicon atom, which process comprises contacting a liquid polymeric dimethylsiloxane containing an average of from 1.98 to 2.0 methyl groups per silicon atom and containing up to 0.5 mol per cent copolymerized monomethylsiloxane with from 0.5 to 3 per cent, by weight, phenoxy phosphoryl dichloride at a temperature of from 25° to 150° C. until a solid elastic product is obtained.

7. A composition of matter comprising (1) a liquid polymeric dimethylsiloxane containing an average of from 1.98 to 2.0 methyl groups per silicon atom and containing up to 2 mol per cent copolymerized monomethylsiloxane and (2) from 0.1 to 10 per cent, by weight, based on the weight of (1) of an organophosphorus compound represented by the general formula

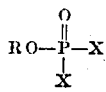

where R is a hydrocarbon radical selected from the class consisting of alkyl, aryl, alkaryl and aralkyl radicals, and X is a halogen.

8. A composition of matter comprising (1) a liquid polymeric dimethylsiloxane containing an average of from 1.98 to 2.0 methyl groups per silicon atom and containing up to 0.5 mol per cent copolymerized monomethylsiloxane and (2) from 0.5 to 3 per cent, by weight, based on the weight of (1), of phenoxy phosphoryl dichloride.

9. The process of making a solid, elastic, curable methyl-substituted polysiloxane which comprises (1) treating a liquid polymeric dimethylsiloxane containing an average of from 1.98 to 2.0 methyl groups per silicon atom and containing up to 2 mol per cent copolymerized monomethylsiloxane with from 0.1 to 10 per cent, by weight, of a compound corresponding to the general formula

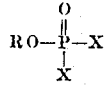

where R is a hydrocarbon radical selected from the class consisting of alkyl, aryl, alkaryl and aralkyl radicals, and X is a halogen, said treatment being conducted at a temperature of from 25° to 150° C. until a solid, elastic product is obtained, (2) compounding the said elastic product with a filler and benzoyl peroxide, and (3) advancing the cure of the filled material by the application of heat.

MURRAY M. SPRUNG.

REFERENCES CITED

The following references are of record in the file of this patent:

UNITED STATES PATENTS

| Number | Name | Date |
|---|---|---|
| 2,371,068 | Rochow | Mar. 6, 1945 |